United States Patent Office 2,723,980
Patented Nov. 15, 1955

2,723,980

PREPARATION OF PHTHALOCYANINE PIGMENTS

Frank R. Tarantino, North Plainfield, and Volney Tullsen, Westfield, N. J., assignors to American Cyanamid Company, New York, N. Y., a corporation of Maine No Drawing. Application October 17, 1951,
Serial No. 251,811

15 Claims. (Cl. 260—314.5)

This invention relates to the preparation of improved phthalocyanine pigments and more particularly to an improved process for preparing phthalocyanine pigments in a finely-divided form exhibiting high tinctorial strength.

Various processes have been proposed for preparing copper phthalocyanine pigments from aromatic o-dinitriles. For example, copper phthalocyanine has been prepared by reacting phthalonitrile and a copper halide in the presence of a heterocyclic base, such as pyridine. The difficulty with such processes, however, is that when it is desired to produce an unhalogenated pigment, the presence of pyridine has an adverse effect on the reaction either in producing low yields of chlorine-free copper phthalocyanine or else chlorinated pigments are produced, depending upon the amount of copper halide present.

Lacey in United States Patent No. 2,302,612 described the first successful process of using cupric halides to produce a chlorine-free copper phthalocyanine pigment wherein an aromatic o-dinitrile was reacted with cupric chloride in an organic liquid diluent such as nitrobenzene which did not function as a reactant as did the pyridine of the earlier processes, and in the presence of sufficient ammonia so that the ammonia reacted with the chlorine set free in the reaction.

Lacey in United States Patent No. 2,318,787 disclosed an improvement upon his earlier process wherein an aromatic o-dinitrile was reacted with cupric sulfate and ammonia in the presence of a similar organic diluent.

King et al. in United States Patent No. 2,318,783 described an improvement upon the Lacey processes from the standpoint of effecting savings in cost of operation by using anhydrous cupric sulfate in the reaction and in carrying out the reaction in an autoclave.

In all three of the foregoing processes, high yields of unchlorinated copper phthalocyanine are produced. These processes may also be used with equal facility to produce other metal phthalocyanine pigments than copper phthalocyanine by substitution of appropriate metal-yielding halides or salts. For example, nickel chloride or nickel sulfate or zinc chloride or zinc sulfate may be used with good results to produce, respectively, nickel phthalocyanine or zinc phthalocyanine.

In carrying out the above-mentioned processes, it has been considered necessary in the past to isolate or recover the crude pigment from the reaction mixture by a series of operations including filtering, steam-distilling of the filter cake to remove the diluent, followed by washing and drying the pigment. The isolated crude pigment has no utility as such because of its harsh texture, unattractive shade and its large crystal size which gives weak and dull tints. Consequently, it has also been necessary in the past to resort to an acid-pasting procedure to produce a commercially acceptable pigment. This procedure involves slurrying the crude pigment in concentrated sulfuric acid followed by drowning in water.

Acid-pasting produces a number of changes in the pigment. The crude pigment is changed from the tinctorially weak alpha form in which it is isolated from the reaction mixture into the tinctorially strong beta form. Also, the pigment is changed into a very finely-divided state having a particle size of the order of a fraction of a micron. The pigment is also rendered soft in texture so that easily dispersible flocs are formed, and, additionally, a tarry residue found in the crude pigment is removed by this procedure, which impurity if present in the finished pigment causes bleeding in lacquers when the phthalocyanine color is made up into a commercial paint formulation.

Acid-pasted phthalocyanine pigments suffer from at least two serious disadvantages, however. In the first place, the crystals have an objectionable tendency to grow when the pigment is brought in contact with aromatic solvents customarily used in paint, enamel, and lacquer systems. Crystal growth is objectionable because it destroys the tinctorial value of the coating composition. The problem of crystal growth was solved by Wiswall, as disclosed in United States Patent No. 2,486,351, and by Loukomsky, as disclosed in United States Patent No. 2,486,304, wherein the pigment was either exposed to the action of a crystallizing liquid and then reduced to a fine particle size by dry-grinding with a grinding aid followed by re-exposure to the liquid, or wherein the pigment was wet-ground with a grinding aid in the presence of a crystallizing liquid. In both of these processes the resultant product is characterized by high tinctorial stability in that no further increase in crystal growth results when the color is incorporated into paint or enamel vehicles containing aromatic solvents.

Acid-pasted phthalocyanine pigments have a second disadvantage in that the acid-pasting step destroys the non-flocculating characteristics of the pigment so that the acid-pasted pigment has a pronounced tendency to flocculate in enamels, lacquers and similar compositions. This phenomenon of flocculation is well known to the art and is adequately described in United States Patent No. 2,524,672.

We have discovered that by carrying out the novel steps hereinafter described it is possible to dispense with the acid-pasting operation and thus obviate the foregoing difficulties. Moreover, by eliminating the acid-pasting step not only are the natural non-flocculating properties of the crude pigment preserved but with the preferred procedure contemplated herein a remarkable increase in resistance to flocculation is imparted to the finished product.

It has also been found that it is not necessary to isolate the crude pigment from the reaction mixture as was heretofore considered to be necessary, but it has been found that the crude pigment may be ground with a solid grinding aid in the presence of the diluent in which the product was synthesized, and thus the present invention has considerable economic advantage in that it eliminates the steps of filtering the crude, steam-stripping the diluent, as well as the subsequent washing and drying steps heretofore necessary.

In its broadest embodiment, the present invention comprises reacting suitable phthalocyanine-forming materials in the presence of an organic liquid diluent, adding a solid grinding aid, and grinding the pigment so formed in the presence of the liquid in which it was synthesized.

In another embodiment of this invention, the solid grinding aid may be added during the reacting period so that the pigment crystals are simultaneously synthesized and ground to a fine particle size.

In still another embodiment of this invention, the crude pigment is synthesized and is taken from the reaction vessel, filtered if necessary to remove any excess diluent and transferred to a suitable grinding device, such as a dough mixer or other grinding device capable of exerting an intensive mixing and shearing action on the material. A solid grinding aid is added, the viscosity of the mixture is adjusted by the addition of filtrate, if necessary, in order to obtain maximum grinding efficiency, and the pigment is ground until the requisite strength has been developed.

In each of these embodiments, the organic liquid is removed from the pigment by suitable means, such as by steam-stripping or by the use of an alcoholic and an aqueous wash. It is preferred, when using those diluents which impart increased resistance to flocculation to the finished pigment, to remove such diluents by an alcohol wash as the steam-stripping operation appears to destroy the non-flocculating properties of the pigment. The pigment is thereafter filtered, washed and air-dried. The finished pigment exhibits a high tinctorial strength.

It is not known just why the present invention may be successfully carried out without having first to remove the tarry residue present in the crude pigment which causes enamels to bleed when the phthalocyanine color is incorporated therein and which has heretofore been removed by acid-pasting the product. Apparently some step in the improved process accomplishes more than one result and thereby makes it unnecessary to acid-paste the product.

The present invention is not limited to any particular method of preparing the phthalocyanine crude excepting, of course, that the reaction must be carried out in the presence of an organic diluent. Therefore, we may use as starting materials a suitable aromatic o-dinitrile, such as phthalonitrile, a metalliferous reagent, such as cupric chloride, nickel chloride, zinc chloride, and the like, and react the components in the presence of an organic diluent with sufficient ammonia to combine with the chlorine set free so as to produce an unhalogenated pigment. We may also use a metal-yielding salt, such as cupric sulfate, nickel sulfate, zinc sulfate, and the like, in place of the metal halide. Or we may use a metal-yielding salt and carry out the reaction in an autoclave. We may also prepare the crude pigment by reacting suitable proportions of phthalic anhydride, urea and a metal-yielding substance in the presence of an organic diluent.

It is also within the scope of this invention to produce a monochlorinated phthalocyanine. For example, copper monochlor phthalocyanine may be prepared by reacting suitable proportions of an aromatic o-dinitrile and cupric chloride in the presence of an organic diluent. In this procedure, it is preferred to use a relatively high boiling diluent in order to cause formation of the chlorinated product. However, a low boiling diluent may be used if the reaction is carried out in an autoclave.

The choice of the organic liquid diluent used in this invention depends to a large extent upon the ultimate results sought. For example, if it is desired to produce a pigment that is characterized by high tinctorial stability in aromatic vehicles and one whose hue is shifted substantially toward the green as compared to the conventional acid-pasted pigments, we may use any of the well-known crystallizing organic liquids such as those described in the Wiswall Patent No. 2,486,351 which transform the pigment crystals from the unstable to the solvent stable alpha crystal form. Should it be desired to obtain this result, in general any suitable aromatic hydrocarbon or chlorinated hydrocarbon may be used. As practical examples of such liquids, there may be mentioned xylene, toluene, trichlorobenzene, etc.

Should it be desired to produce a finished pigment whose hue is a strong bright reddish blue closely approximating the shade of the conventionally prepared acid-pasted pigments, we may use a wide variety of organic liquids which do not exert any crystallizing action on the pigment. We may use those hydroaromatic hydrocarbons exemplified by cyclohexane, methylcyclohexane, dimethylcyclohexane, ethylcyclohexane, and decalin. Or we may use certain lower aliphatic compounds, such as diethylene glycol for example, which produce pigments having exceptionally high tinctorial strength.

We have found the use of nitrobenzene or quinoline as diluents to be particularly efficacious in that the pigments prepared and ground in the presence of these diluents have remarkable resistance to flocculation.

It is known that the measurement of the strength of color of a pigment by means of a spectrophotometer will give a numerical measure of the degree of flocculation, or rather the loss in color value resulting from flocculation of a pigment made up into a lacquer enamel. By comparison of the color value of a sprayed lacquer film with a dipped lacquer film, it is possible to evaluate the degree of flocculation in a dipped film by measurement of the loss in strength.

It is generally recognized in the art that in order for a phthalocyanine pigment to be considered essentially non-flocculating so as to meet the demands of the trade, the strength percentage of the dipped film should be at least 90% and preferably 95% of the color value of the sprayed film.

Spectrophotometric analysis of the pigment prepared and ground in the presence of either nitrobenzene or quinoline shows that there is scarcely any perceptible difference in color value between the dipped film and the sprayed film which indicates that there is at most only a trace of flocculation in this pigment.

It is a further advantage that the pigment prepared and ground in the presence of either nitrobenzene or quinoline is completely solvent stable and may be incorporated in paints, enamels, and the like, and stored for an indefinite period without any change in crystal size and consequently no diminishing of tinctorial strength.

As stated hereinbefore, the reaction may be carried out in a suitable open vessel or in an autoclave. If the product is to be made and ground in the same apparatus, it is, of course, necessary to equip the apparatus with a suitable stirring or agitating device in order that the pigment may be ground. In such an event, it is preferred to equip the apparatus with a high-speed stirrer, such as an Eppenbach stirrer. A turbo mixer may also be used with equally good results.

If the pigment is made in one vessel and is transferred to another for grinding where it may be necessary to filter the product to remove excess diluent, if any, or should it be necessary to add additional filtrate in order to produce a proper viscosity for maximum grinding efficiency to take place, it is preferred to use a dough mixer or other suitable apparatus capable of exerting an intensive mixing and shearing attrition on the pasty or doughy mass.

Any suitable material may be used as the solid grinding aid. We may use sodium chloride, calcium carbonate, or finely-divided materials, such as diatomaceous earth, blanc fixe, powdered silica, soluble carbohydrates, and the like, and which may be removed if desired after the grinding operation has been completed by means of a suitable washing operation.

The particle size of the grinding aid used in the invention is not particularly critical. When a dough mixer or other equivalent device is used for grinding the pigment, the use of grinding aids having a particle size as described and claimed in the copending application of Thomas D. Mutaffis, Serial No. 251,817, filed concurrently herewith, now Patent No. 2,669,569, has been found to produce excellent results.

In the embodiment of the present invention wherein the pigment is simultaneously synthesized and ground, sufficient organic diluent should be present so as to maintain a satisfactory slurry essential for high speed grinding.

In the examples which follow which deal with the preparation of the phthalocyanine pigment using phthalonitrile as the starting material, obviously other suitable aromatic o-dinitriles may be employed. It is also to be understood that a suitable metalliferous reagent must be employed and, while the examples refer to the use of a copper salt, the invention may be carried out with equal facility with other metal salts or metallic halides, such as, for example, nickel or zinc chloride, or nickel or zinc sulfate, and the like.

Example 1

700 parts of mononitrobenzene, 178 parts of phthalonitrile, and 56 parts of anhydrous cupric sulfate were charged into a reaction vessel equipped with an Eppenbach stirrer. Ammonia gas was bubbled through the mixture until the mixture was saturated. During the ammonia saturation period, the stirrer was rotated at approximately 2,000 R. P. M. The mixture was heated to a reacting temperature of between 150° C. and 193° C. and the temperature was maintained until completion of the reaction. The reaction mixture was then cooled and 2000 parts of micropulverized salt were added slowly and the speed of the stirrer was increased to approximately 5,000 R. P. M. during the addition of the salt. The pigment was ground with the stirrer operating at between 4,500 R. P. M. and 5,000 R. P. M. until the desired pigment particle size was obtained. The ground pigment was then slurried in 3A alcohol, filtered and further washed in alcohol. The pigment was washed with a 10% sulfuric acid solution, washed acid-free and thereafter air-dried. The blue pigment had a strong bright greenish shade. When tested for strength by mulling in lithographic varnish, this product had a color value 20% stronger than a commercially available product. This product when boiled in xylene for two hours showed no evidence of crystal growth and retained essentially its original strength. The pigment was evaluated for flocculation tendencies by incorporating the color in a lacquer base by ball milling. The colored lacquer base was then diluted or tinted with a titanium dioxide lacquer base using 5 parts of this colored blue enamel to 95 parts of titanium dioxide enamel. The tinted base was then diluted with lacquer thinner to spraying consistency. A tin panel was sprayed with a smooth, uniform film of the finished lacquer and the film was permitted to dry. The tin panel was thereafter dipped into the same lacquer to the depth of one-half of the sprayed film, extracted and held vertically until all the excess lacquer had flowed off and a second film had dried over the lower half of the sprayed film. Spectrophotometric analysis of the strength value of the dipped film against the strength value of the sprayed film showed scarcely any perceptible difference in strength or possibly only 2–3% weaker. A commercially available, similar green shade, alpha form of phthalocyanine blue tested by the above procedure gave a strength of only 65% of the dipped film against the sprayed film indicating a considerable degree of flocculation.

Example 2

1,602 parts of phthalonitrile, 502 parts of anhydrous cupric sulfate, and 5,286 parts of mononitrobenzene were charged to a reaction vessel equipped with a turbo mixer and a reflux condenser. The mixture was stirred at 575 R. P. M. Ammonia gas was bubbled through the mixture until the mixture was saturated. The mixture was heated to a reacting temperature of 125° C. and the temperature was maintained between 125° C. and 135° C. until the reaction was completed. The reaction mixture was then cooled. 16,000 parts of micropulverized salt were added slowly over a period of three hours with agitation at a speed of 1,125 R. P. M. 95 parts of naphthenic acid were then added to defloculate the paste. The grinding was continued for 15 hours with the temperature of the mix rising to between 85° C. and 110° C. caused by the heat generated during grinding. 200 parts of the ground paste were washed successively with 3A alcohol, a 10% sulfuric acid wash, and a hot water wash to free the paste from acid, and the pigment was thereafter air-dried. The product of this example was identical in all respects with the product of Example 1 as regards solvent stability and resistance to flocculation. Additionally, this product was 32% stronger than a prior art product.

Example 3

178 parts of phthalonitrile, 56 parts of anhydrous cupric sulfate, and 900 parts of quinoline were charged to a reaction vessel equipped with an Eppenbach stirrer. Ammonia gas was bubbled through the mixture with the stirrer rotating at about 600 R. P. M. After the mixture had been saturated with ammonia, the stirrer was advanced to 1,500 R. P. M. and the mixture was heated. Ammonia was fed in at a lower rate than during the initial saturation period and the reaction was carried to completion by heating between 160° C. and 221° C. During the reaction period, the speed of the stirrer was varied between 1,000 R. P. M. and 1,500 R. P. M. the speed being varied because of the changes necessitated by the exothermic reaction. On completion of the reaction, 2,000 parts of micropulverized salt were added. The speed of the stirrer was advanced to approximately 4,500 R. P. M. and the grinding was continued for 4.5 hours. A sample of the paste was removed from the charge, slurried in 3.7% hydrochloric acid solution, filtered, washed free of acid and salt by tap water and air-dried. Ink rub-outs showed the pigment to be slightly weaker tinctorially than the products of Examples 1 and 2 but this product had substantially the same resistance to flocculation as did the products of the preceding examples.

Example 4

178 parts of phthalonitrile, 62 parts of anhydrous cupric sulfate, and 700 parts of quinoline were charged to a reaction vessel as used in the preceding example. The mixture was saturated with ammonia by bubbling ammonia gas therethrough with constant stirring of the mixture. During the saturation period, the speed of the stirrer was maintained between 1,600 and 1,800 R. P. M. After the mixture had been saturated, 1,800 parts of micropulverized salt were added slowly. During the addition of the salt, the flow of ammonia was continued but at a slower rate than during the saturation period. The mass was stirred at approximately 4,000 to 5,000 R. P. M. while being heated to reacting temperatures between 129° C. and 161° C. During the reacting and grinding period, 125 parts of quinoline were added in aliquot portions of 25 parts each when the mass became thixotropic and decreased in flow. A sample of the pigment taken from the charge was cleansed by washing with 3A alcohol and a 10% solution of sulfuric acid. The pigment was then washed with hot tap water to a pH of 4, followed by a 3% sodium hydroxide solution wash and a water wash to free the pigment of alkali. The pigment was thereafter air-dried. The pigment, when made into a lacquer enamel as described in Example 1, was found to possess the same non-flocculating properties as the product of Example 1.

Example 5

600 parts of mononitrobenzene, 178 parts of phthalonitrile, and 56 parts of anhydrous cupric sulfate were charged into a reaction vessel equipped with an Eppenbach stirrer. The stirrer was rotated at approximately 1,600–1,800 R. P. M. while ammonia gas was bubbled through the mixture. When the mixture was saturated with ammonia, 2,200 parts of micropulverized salt were slowly added. During the addition of the salt, the speed of the stirrer was increased to 4,200–5,100 R. P. M. The mixture was heated to reaction temperatures of between 118° C. and 161° C. During the heating and reacting period, the stirrer was operated at 4,200–5,100 R. P. M. so as to grind the pigment as it was being formed. Additional quantities of mononitrobenzene were added during the grinding period to maintain a suitable consistency for uniform grinding. After the grinding operation was completed, the pigment was removed, successively washed with 3A alcohol and a 10% sulfuric acid solution, and thereafter neutralized with a water wash and air-dried.

The resulting bright greenish blue pigment exhibited good tinctorial strength and good tinctorial stability in aromatic solvents. The flocculation-resistant characteristics of this product were substantially the same as the products of the preceding examples.

Example 6

175 parts of phthalonitrile, 55 parts of anhydrous cupric sulfate, and 1200 parts of mononitrobenzene were charged to a reaction vessel and gaseous ammonia was bubbled through the mixture. The reaction mixture was saturated with ammonia with rapid stirring. External heat was applied to heat the mixture to 120° C. at which an exothermic reaction occurred which carried the temperature to 160° C. The temperature was maintained until the reaction was completed and the mixture was then cooled and filtered. Press cake equal to 60 parts of the crude pigment, 175 parts of mononitrobenzene, and 550 parts of micropulverized salt were charged into a dough mixer and mixed for 12 hours at room temperature. When the copper phthalocyanine had been reduced to the proper size, 500 parts of methanol were added, the slurry stirred and filtered. The residue was then washed with 500 parts of methanol after which it was slurried with 1,000 parts of methanol and again filtered. The filter cake was slurried in 2,000 parts of water, filtered, washed, and dried at 60° C. The resulting product was a strong green shade pigment having good resistance to crystallization and excellent resistance to flocculation.

Example 7

A copper phthalocyanine crude was prepared by following the procedure of the preceding example except that 1200 parts of xylene were substituted for the mononitrobenzene used therein and the reaction was carried out under pressure at 200° C. The reaction mixture was then cooled and filtered. Press cake equal to 60 parts of the crude pigment and 80 parts of xylene were charged into a dough mixer, after which 60 parts of xylene and 550 parts of micropulverized salt were added. The mixture was ground for 12 hours at room temperature, after which it was drowned in 3,000 parts of water. After removal of the xylene by steam stripping, the pigment was filtered, washed with 1,000 parts of 5% sulfuric acid solution, washed with water to remove the sulfuric acid, washed with 1,000 parts of ¼% soda ash solution, and finally washed with water to remove the excess soda ash and then dried at 60° C. The resulting bright blue pigment had a greenish shade and possessed the solvent stable alpha crystal form.

Example 8

A copper phthalocyanine crude was prepared by the procedure of Example 6 except that 1200 parts of diethylene glycol were substituted for the mononitrobenzene used in Example 6. The product was thereafter cooled and filtered. Press cake equal to 70 parts of the crude pigment and 130 parts of diethylene glycol were charged into a dough mixer, after which 550 parts of micropulverized salt were added and the mixture was ground for 12 hours at room temperature. The charge was thereafter drowned into 2,000 parts of water and stirred for one hour. The pigment was then filtered, washed with 4,000 parts of 5% sulfuric acid solution, again washed with water, washed with 2,000 parts of ¼% sodium carbonate solution, and finally washed with water until all traces of the carbonate had been removed. The pigment was then dried at 60° C. The resulting product was a red shade blue pigment having excellent tinctorial value and moderate non-flocculating properties.

Example 9

A crude copper phthalocyanine pigment was prepared by the procedure of Example 7 except that 1200 parts of methylcyclohexane were substituted for the xylenes used therein. The reaction was carried out as in Example 7 and the product was thereafter filtered. 220 parts of the filter cake containing about 95 parts real pigment were charged into a dough mixer. 420 parts of microatomized salt having a surface area of 0.45 square meter per gram were added and the mixture was ground for about twenty hours. The product was then slurried in 2,000 parts of 3A alcohol and filtered. The press cake was thereafter slurried in 2,000 parts of water, filtered, washed until it was free of salt and air-dried at 60° C. The color of the pigment, when tested by mulling in a lithographic varnish was found to be a strong bright reddish blue.

Example 10

The procedure of the preceding example was repeated except that 1200 parts of decalin were substituted for the methylcyclohexane used in Example 9. The reaction was carried out as in Example 9 and the product was thereafter filtered. 240 parts of the press cake containing about 100 parts real pigment and 420 parts of microatomized salt as used in the preceding example were charged into a dough mixer and ground for about twenty hours. The decalin was removed by washing with acetone after the grinding was completed. The pigment was thereafter isolated and recovered as in the preceding example. When the dry pigment was tested by mulling with a lithographic varnish, the color was a bright reddish blue slightly weaker in tinctorial value than the product of Example 9.

Example 11

55 parts of phthalic anhydride, 75 parts of urea, 18 parts of anhydrous cupric sulfate, 0.18 part of $MoO_3$ and 200 parts of trichlorobenzene were heated with agitation to 205° C. and maintained at this temperature until the reaction was completed. The mixture was cooled to 125° C., filtered and washed with trichlorobenzene until the filtrate was colorless. The press cake yielded 45 parts of crude copper phthalocyanine and 50 parts of tricholorbenzene. The press cake was then charged to a dough mixer, 90 parts of trichlorobenzene and 360 parts of micropulverized salt were added. The mixture was ground for about fifteen hours. The charge was then slurried in 2,000 parts of 3A alcohol, filtered, washed with 1,000 parts of 3A alcohol, and slurried in 4,000 parts of water. The liquid was decanted and the mass stirred into 2,000 parts of water containing 50 parts of hydrochloric acid. The slurry was heated to 60° C., the pigment filtered, washed acid-free and thereafter dried at 60° C. The resulting greenish blue pigment was tinctorially strong.

Example 12

126 parts of phthalonitrile, 35 parts of anhydrous cupric chloride and 1260 parts of mononitrobenzene were charged to a reaction vessel and heated with stirring to 211° C. The heating was continued at this temperature with refluxing taking place until the reaction was completed. The reaction mixture was cooled to 100° C. and filtered as dry as possible. The press cake containing about 130 parts of monochlor copper phthalocyanine and 250 parts of mononitrobenzene was charged to a dough mixer. 400 parts of microatomized salt having a surface area of 0.86 square meter per gram were added and the mixture was ground for 4 hours. 500 parts of methanol were added and the mixing continued until a thin slurry was formed. The mass was filtered and washed with methanol until it was free of mononitrobenzene. 4000 parts of water containing a 10% solution of sulfuric acid was added to the press cake. The mixture was stirred to dissolve the salt, filtered, washed acid-free and chloride-free and the pigment was thereafter dried at 80° C. A non-flocculating red shade monochlor copper phthalocyanine blue pigment was obtained having good can stability.

Trichlorobenzene, chloro-naphthalene, or methyl-naphthalene may be substituted for the mononitrobenzene used in the foregoing example with equally good results.

The terminology used throughout the specification and claims in referring to the alpha and beta crystal forms of phthalocyanine blue is in accordance with the nomenclature used by R. H. Kienle in Official Digest, Federation of Paint and Varnish Production Clubs, No. 300, page 48, January 1950.

We claim:

1. In the process of producing a noncrystallizing, essentially nonflocculating chlorine-free metallized phthalocyanine pigment, the steps which comprise heating at reaction temperature phthalic anhydride, urea and a metallic salt in the presence of a crystallizing organic liquid so as to form the metallized phthalocyanine, adding a solid grinding aid to the reaction mixture, subjecting the phthalocyanine to grinding in the presence of the organic liquid until the phthalocyanine is transformed into finely-divided, crystallizing organic liquid stable form, and thereafter recovering the pigment.

2. The process according to claim 1 in which the metallic salt is a copper salt and in which the organic crystallizing liquid is trichlorobenzene.

3. The process of producing a noncrystallizing, essentially nonflocculating chlorine-free metallized phthalocyanine pigment, the steps which comprise heating at reaction temperature phthalonitrile, a metallic salt and ammonia in the presence of a crystallizing organic liquid, so as to form the metallized phthalocyanine, adding a solid grinding aid to the reaction mixture, subjecting the phthalocyanine to grinding in the presence of the organic liquid until the phthalocyanine is transformed into finely-divided, crystallizing organic liquid stable form, and thereafter recovering the pigment.

4. The process according to claim 3 in which the metallic salt is a copper salt.

5. The process according to claim 4 in which the copper salt is cupric sulfate.

6. The process according to claim 4 in which the organic crystallizing liquid is an aromatic hydrocarbon.

7. The process according to claim 6 in which the aromatic hydrocarbon is xylene.

8. The process according to claim 4 in which the organic crystallizing liquid is mononitrobenzene.

9. The process according to claim 4 in which the organic crystallizing liquid is quinoline.

10. The process of producing a noncrystallizing, essentially nonflocculating, chlorine-free metallized phthalocyanine pigment, the steps which comprise charging phthalonitrile, a metallic salt and a crystallizing organic liquid into a reaction vessel, saturating the mixture with ammonia, adding a solid grinding aid to the mixture, heating the mixture to phthalocyanine-forming reaction temperatures while simultaneously subjecting the mixture to grinding so as to grind the phthalocyanine as it is being formed, continuing the grinding until the phthalocyanine is transformed into finely-divided, crystallizing organic liquid stable form, and thereafter recovering the pigment.

11. The process according to claim 10 in which the metallic salt is cupric sulfate.

12. The process according to claim 11 in which the crystallizing organic liquid is mononitrobenzene.

13. The process according to claim 11 in which the crystallizing organic liquid is quinoline.

14. As a new product, a pigment comprising noncrystallizing, essentially nonflocculating, chlorine free, metallized phthalocyanine in the form of alpha crystals, said pigment being characterized by a greenish shade of blue, said pigment being further characterized by substantial absence of tendency to increase its crystal size, with attendant loss in tinctorial strength, when boiled for one hour in xylene, said pigment being further characterized by substantial absence of tendency to flocculate, with attendant loss in tinctorial strength, when incorporated into paint, lacquer, and enamel systems.

15. The product according to claim 14 in which the metallized phthalocyanine is copper phthalocyanine.

References Cited in the file of this patent

UNITED STATES PATENTS

| | | |
|---|---|---|
| 2,556,728 | Graham | June 12, 1951 |
| 2,556,729 | Stallman | June 12, 1951 |
| 2,556,730 | Graham | June 12, 1951 |
| 2,615,026 | Lytle | Oct. 21, 1952 |
| 2,615,027 | Bluemmel | Oct. 21, 1952 |